H. B. WHITE.
BASKET.
APPLICATION FILED MAY 22, 1920.
1,351,195.
Patented Aug. 31, 1920.
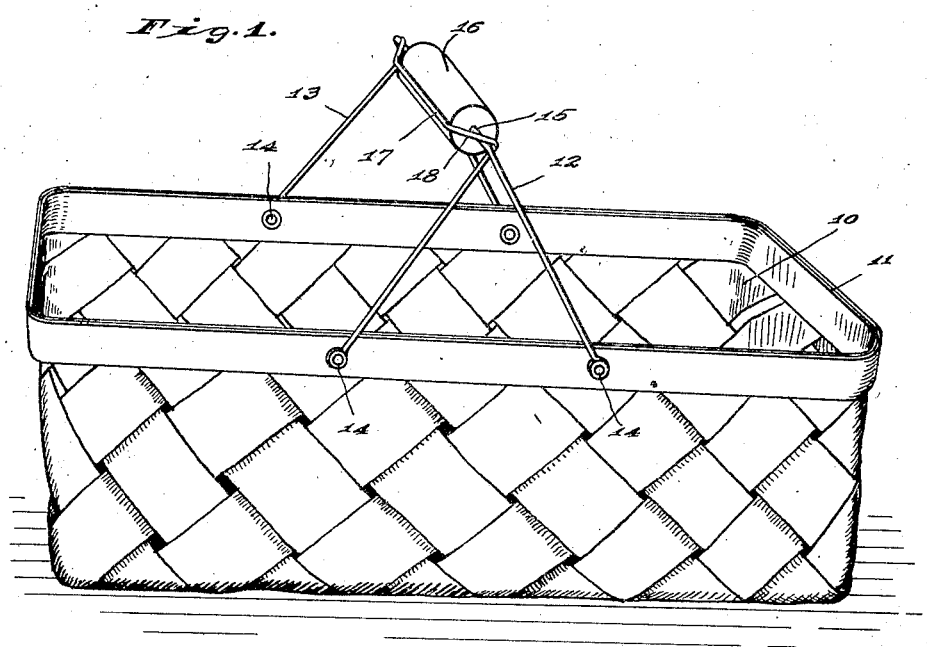
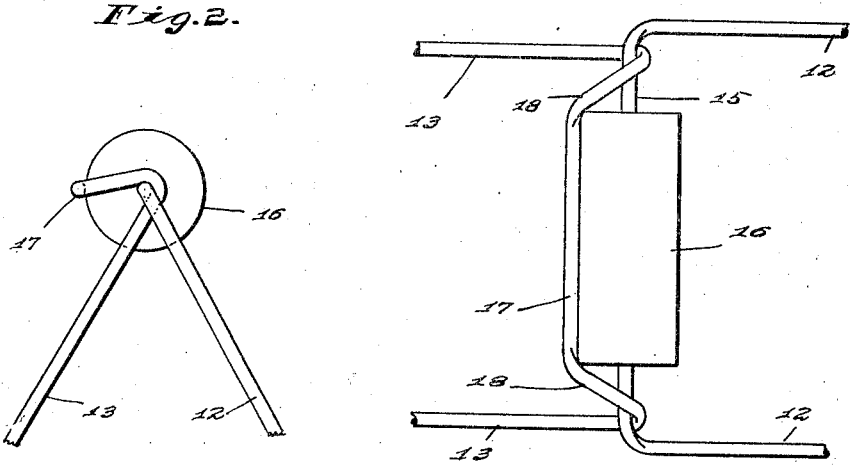

UNITED STATES PATENT OFFICE.

HARLAN B. WHITE, OF CROTHERSVILLE, INDIANA.

BASKET.

1,351,195.   Specification of Letters Patent.   Patented Aug. 31, 1920.

Application filed May 22, 1920. Serial No. 383,541.

*To all whom it may concern:*

Be it known that I, HARLAN B. WHITE, a citizen of the United States, residing at Crothersville, in the county of Jackson and State of Indiana, have invented a new and useful Basket, of which the following is a specification.

It is the object of my invention to provide a double-bail basket in which the bails may be swung out of the way in the usual manner of such baskets but when together are free from the danger of pinching the carrying hand and provide an easy grip and are interlocked to hold them in proper relative position.

The accompanying drawing illustrates my invention. Figure 1 is a perspective view of a double-bail basket embodying my invention; Fig. 2 is a side elevation of the upper parts of the two bails, in interlocking relation; and Fig. 3 is a plan of the parts shown in Fig. 2.

The basket body 10 may be of any usual type, being shown as a common woven market basket with the usual reinforcing strip 11 around the upper edge.

Two bails 12 and 13, made of wire, have their free ends pivoted on the reinforcing strip 11 on the longitudinal sides of the basket, the two bails being pivoted at substantially equal distances from the center of the basket to give balance. The pivotal mounting for the bails 12 and 13 is provided by eyes formed on the free ends of such bails and encircling outwardly projecting pins 14 fixed in the reinforcing strip 11.

The bail 12 is approximately U-shaped, with a straight base part 15 on which is mounted a wooden or other handle 16 such as is ordinarily used on bucket bails. The straight part 15 is slightly longer than the handle, to leave the latter entire freedom of movement and to provide beyond the ends of the handle projecting locking portions for coöperation with the other bail. The bail 13 is also in general U-shaped, but on the central straight portion 17 forming its base there is no handle, and such central straight portion is of slightly less length than the straight portion 15 of the bail 12 and is connected to the legs of the bail 13 by portions 18 bent at an angle to the plane of the legs of the bail to form with such legs hooks which may coöperate with the projecting ends of the straight portion 15 of the bail 12. The bent portions 18 are of such length and at such an angle that the parts must be slightly pressed in order to snap the bails together in the position shown or to unsnap them, so that when together they will stay together; and at such an angle that when two bails are together the straight portion 17 of the bail lies about in the horizontal plane of the straight portion 15 of the bail 12 so that it lies beside and neither above nor below the handle 16. By this arrangement, all danger of pinching the hand which grasps the handle 16 is avoided.

In operation, the two bails 12 and 13 may be swung back out of the way when the basket is being filled or emptied, if that is desired. For carrying purposes, however, the two bails are swung together as shown, so that the bail 13 hooks around the straight portion 15 forming the base of the bail 12 with the straight portion 17 forming the base of the bail 13 lying beside the handle 16. As stated, in putting the two bails together or separating them the base portion 17 of the bail 13 must be sprung or snapped over the handle 16. When the basket is now carried, the hand grasps the handle 16, and the weight from both bails is transmitted to such handle, that from the bail 12 directly by the straight portion 15 of such bail, and that from the bail 13 by reason of the hooking of the parts 18 over the part 15 of the bail 12.

I claim as my invention:

1. A double-bail basket, comprising a basket with two separably movable wire bails pivotally attached thereto, one of said bails being provided with a carrying handle on its base, and the other bail being provided with an offset base portion which provides hooks which hook around the handle on the first bail.

2. A double-bail basket, comprising a basket with two separably movable wire bails pivotally attached thereto, one of said bails being provided with a carrying handle on its base, and the other bail being provided with an offset base portion which provides hooks which hook around the handle on the first bail, the base of the second bail when hooked to the first bail being arranged to lie approximately horizontal beside the handle on the first bail.

3. A double-bail basket, comprising a basket with two separably movable wire bails pivotally attached thereto, one of said bails being provided with a substantially straight base portion on which a carrying handle of less length than such base portion is mounted, and the other bail being provided with a base portion of a length intermediate between that of the handle and that of the base portion of the first bail, said base portion of the second bail being offset from the plane of the legs of said bail and connected thereto by lateral projections from the ends of such legs.

4. A double-bail basket, comprising a basket with two separably movable wire bails pivotally attached thereto, one of said bails being provided with a substantially straight base portion on which a carrying handle of less length than such base portion is mounted, and the other bail being provided with a base portion of a length intermediate between that of the handle and that of the base portion of the first bail, said base portion of the second bail being offset from the plane of the legs of said bail and connected thereto by lateral projections from the ends of such legs, said lateral projections being of such length and angle that the parts must be sprung when the base portion of the second bail is moved into and out of coöperative relation with said handle.

5. A double-bail basket, comprising a basket with two separably movable wire bails pivotally attached thereto, one of said bails being provided with a substantially straight base portion on which a carrying handle of less length than such base portion is mounted, and the other bail being provided with a base portion of a length intermediate between that of the handle and that of the base portion of the first bail, said base portion to the second bail being offset from the plane of the legs of said bail and connected thereto by lateral projections from the ends of such legs, said lateral projections being of such length and angle that when the base portions of the two bases are associated the base portion of the second bail lies approximately horizontally beside said handle.

In witness whereof I have hereunto set my hand at Crothersville, Indiana, this 13th day of May, A. D. one thousand nine hundred and twenty.

HARLAN B. WHITE.